(12) United States Patent
Dai et al.

(10) Patent No.: US 11,962,362 B2
(45) Date of Patent: Apr. 16, 2024

(54) WIRELESS TELECOMMUNICATIONS NETWORK

(71) Applicant: BRITISH TELECOMMUNICATIONS PUBLIC LIMITED COMPANY, London (GB)

(72) Inventors: Linglong Dai, London (GB); Hao Jiang, London (GB); Jianjun Li, London (GB); Mo Hao, London (GB); Richard MacKenzie, London (GB); Arman Shojaeifard, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 18/251,467

(22) PCT Filed: Oct. 21, 2021

(86) PCT No.: PCT/EP2021/079166
§ 371 (c)(1),
(2) Date: May 2, 2023

(87) PCT Pub. No.: WO2022/090044
PCT Pub. Date: May 5, 2022

(65) Prior Publication Data
US 2023/0308200 A1  Sep. 28, 2023

(30) Foreign Application Priority Data

Nov. 2, 2020 (WO) ............... PCT/CN2020/125911

(51) Int. Cl.
*H04B 17/391* (2015.01)

(52) U.S. Cl.
CPC ..... *H04B 17/3913* (2015.01); *H04B 17/3912* (2015.01)

(58) Field of Classification Search
CPC ................ H04B 17/3913; H04B 17/3912
See application file for complete search history.

(56) References Cited

FOREIGN PATENT DOCUMENTS

| CN | 111181618 A | 5/2020 |
|----|-------------|--------|
| CN | 111294095 A | 6/2020 |

(Continued)

OTHER PUBLICATIONS

Gao J., et al., "Unsupervised Learning for Passive Beamforming," arXiv:2001.02348v1 [cs.IT], Jan. 8, 2020, 5 pages.

(Continued)

*Primary Examiner* — Natasha W Cosme
(74) *Attorney, Agent, or Firm* — Pranger Law PC (57) ABSTRACT

A method of controlling transmission of a wireless signal in a wireless telecommunications network including a transmitting node, a receiving node, and an Intelligent Reflective Surface (IRS), the transmitting node including a processor operating a first neural network that inputs an input bit sequence and outputs the wireless signal and a transmitter to transmit the wireless signal output by the first neural network, the IRS includes a reflective surface for reflecting the wireless signal transmitted by the transmitter and further includes a processor for applying a phase change to the wireless signal according to a phase shift matrix, and the receiving node includes a receiver for receiving an accumulated wireless signal transmitted by the transmitter and reflected off the reflective surface and a processor operating a second neural network that inputs the received accumulated wireless signal and outputs an output bit sequence.

11 Claims, 6 Drawing Sheets

(56) References Cited

FOREIGN PATENT DOCUMENTS

| CN | 111355519 A | 6/2020 |
|---|---|---|
| WO | WO-2018156869 A1 | 8/2018 |
| WO | WO-2019038693 A1 | 2/2019 |

OTHER PUBLICATIONS

Glorot X., et al., "Understanding the Difficulty of Training Deep Feedforward Neural Networks," Journal of Machine Learning Research, Jan. 2010, vol. 9, pp. 249-256.

He K., et al., "Delving Deep into Rectifiers: Surpassing Human-Level Performance on ImageNet Classification," arXiv: 1502.01852, Feb. 6, 2015, 11 pages.

International Search Report and Written Opinion for International Application No. PCT/CN2020/125911, dated Jun. 11, 2021, 10 pages.

International Search Report and Written Opinion for International Application No. PCT/EP2021/079166, dated Mar. 4, 2022, 13 pages.

Kula M., et al., "Simple. Flexible. Powerful," Keras, [Retrieved on May 1, 2023], Retrieved from the Internet: URL: https://keras.io, 5 pages.

Nadeem Q.U.A., et al., "Intelligent Reflecting Surface Assisted Wireless Communication: Modeling and Channel Estimation," arXiv:1906.02360v2 [eess.SP], Dec. 13, 2019, 7 pages.

O'Shea T., et al., "An Introduction to Deep Learning for the Physical Layer," arXiv:1702.00832v2 [cs.IT], Jul. 11, 2017, 13 pages.

Taha A., et al., "Deep Learning for Large Intelligent Surfaces in Millimeter Wave and Massive MIMO Systems," IEEE, May 2019, 6 pages.

Xue S., et al., "Unsupervised Deep Learning for MU-SIMO Joint Transmitter and Noncoherent Receiver Design," IEEE Wireless Communications Letters, Feb. 2019, vol. 8, No. 1, pp. 177-180.

WIRELESS TELECOMMUNICATIONS NETWORK

PRIORITY CLAIM

The present application is a National Phase entry of PCT Application No. PCT/EP2021/079166, filed Oct. 21, 2021, which claims priority from PCT Application No. PCT/CN2020/125911, filed Nov. 2, 2020, each of which is hereby fully incorporated herein by reference.

TECHNICAL FIELD

The present disclosure relates to a wireless telecommunications network having an intelligent reflective surface.

BACKGROUND

In wireless telecommunications, a wireless signal being transmitted between a transmitter and receiver generally degrades due to interference from other wireless signals and/or other physical phenomena (e.g. fading and blockage). This has generally been addressed by improving the transmission characteristics (e.g. higher power transmissions or repeaters) or transmission processing techniques (e.g. more robust modulation schemes). An emerging concept in wireless telecommunications is the concept of a reconfigurable propagation environment, or "smart radio environment", which may improve the transmission quality. This may be achieved by use of a surface of electromagnetic material, often known as an Intelligent Reflective Surface (IRS), which may be operated so as to apply a change to an incident wireless signal, such as a change in phase, amplitude, frequency and polarization, so as to improve the transmission quality between the transmitter and the receiver.

In a conventional system having only a transmitter and receiver, the receiver may receive a wireless signal in a direct path between the transmitter and receiver or via one or more reflected signals. In a first scenario, the receiver may not be able to successfully receive either of the direct or reflected signals from the transmitter (that is, the receiver is in a "not-spot"). In a second scenario, a reflected signal between the transmitter and receiver (e.g. reflected off a nearby building) degrades another received signal (e.g. the direct signal) by destructive interference. Both of these scenarios can be improved by the introduction of an IRS. In the first scenario where the receiver cannot receive either the direct or reflected signals from the transmitter, the IRS may act upon the reflected signal so that it may be successfully received at the receiver. Furthermore, in the second scenario, the IRS may phase shift the incident wireless signal so that it constructively interferes with the direct signal between the transmitter and receiver. The IRS may therefore be used to improve transmission quality between the transmitter and the receiver.

Furthermore, an IRS may be a cost effective solution to improving transmission quality compared to alternative solutions, such as by increasing access point density, as IRSs are nearly passive and easy to deploy. In practical implementations, the IRS controller must calculate the change (e.g. phase shift) to apply to an incident wireless signal in order to improve transmission quality at the receiver. Existing research tends to focus on enhancing capacity or energy saving.

Alternative names for the IRS include large intelligent surface, large intelligent metasurface, programmable metasurface, reconfigurable metasurface, smart reflect-arrays, reconfigurable intelligent surface, software-defined surface, and passive intelligent surface. The term "reconfigurable" is often used to indicate that the angle of reflection can be configured regardless of the angle of incidence.

SUMMARY

According to a first aspect of the disclosure, there is provided a method of controlling transmission of a wireless signal in a wireless telecommunications network, the wireless telecommunications network including a transmitting node, a receiving node, and an Intelligent Reflective Surface (IRS) wherein the transmitting node includes a processor operating a first neural network that inputs an input bit sequence and outputs the wireless signal and further includes a transmitter to transmit the wireless signal output by the first neural network, the IRS includes a reflective surface for reflecting the wireless signal transmitted by the transmitter of the transmitting node and further includes a processor for applying a phase change to the wireless signal according to a phase shift matrix, and the receiving node includes a receiver for receiving an accumulated wireless signal transmitted by the transmitter of the transmitting node and reflected off the reflective surface of the IRS and further includes a processor operating a second neural network that inputs the received accumulated wireless signal and outputs an output bit sequence, the method comprising determining a current propagation environment for a transmission between the transmitter and the receiver; simulating a transmission of a first input bit sequence between the transmitting node and the receiving node via the IRS for the current propagation environment, in which the first neural network utilizes a first set of neural network weights, the second neural network utilizes a second set of neural network weights, and the IRS utilizes a first phase shift matrix having a first set of phase shift matrix values, the simulation producing a first output bit sequence; calculating a loss between the first input bit sequence and the first output bit sequence; iterating the simulating and the calculating for a plurality of iterations, in which the first set of neural network weights, second set of neural network weights and the first set of phase shift matrix values are updated in each iteration based on the calculated loss of the previous iteration, until a termination criterion is met; and causing the transmitting node to use the first set of neural network weights of the final iteration, the receiving node to use the second set of neural network weights of the final iteration, and the IRS to use the first set of phase shift matrix values of the final iteration.

The termination condition may be that the calculated loss has converged for a plurality of iterations. The termination condition may be that the calculated loss has converged at or near a minimum value for a plurality of iterations.

The loss may be calculated based on a cross-entropy loss function.

The method may further comprise determining that a reconfiguration condition has been met; and in response to the determination that the reconfiguration condition has been met, repeating the determining of the current propagation environment, the simulating, the calculating, the iterating, and the causing.

The method may be performed by the transmitting node.

According to a second aspect of the disclosure, there is provided a computer program comprising instructions which, when the program is executed by a computer, cause the computer to carry out the method of the first aspect of the disclosure. The computer program may be provided on a computer readable carrier medium.

According to a third aspect of the disclosure, there is provided a node for controlling transmission of a wireless signal in a wireless telecommunications network, the wireless telecommunications network including a transmitting node, a receiving node, and an Intelligent Reflective Surface (IRS) wherein the transmitting node includes a processor operating a first neural network that inputs an input bit sequence and outputs the wireless signal and further includes a transmitter to transmit the wireless signal output by the first neural network, the IRS includes a reflective surface for reflecting the wireless signal transmitted by the transmitter of the transmitting node and further includes a processor for applying a phase change to the wireless signal according to a phase shift matrix, and the receiving node includes a receiver for receiving an accumulated wireless signal transmitted by the transmitter of the transmitting node and reflected off the reflective surface of the IRS and further includes a processor operating a second neural network that inputs the received accumulated wireless signal and outputs an output bit sequence, the node comprising a processor adapted to: determine a current propagation environment for a transmission between the transmitter and the receiver; simulate a transmission of a first input bit sequence between the transmitting node and the receiving node via the IRS for the current propagation environment, in which the first neural network utilizes a first set of neural network weights, the second neural network utilizes a second set of neural network weights, and the IRS utilizes a first phase shift matrix having a first set of phase shift matrix values, the simulation producing a first output bit sequence; calculate a loss between the first input bit sequence and the first output bit sequence; iterate the simulating and the calculating for a plurality of iterations, in which the first set of neural network weights, second set of neural network weights and the first set of phase shift matrix values are updated in each iteration based on the calculated loss of the previous iteration, until a termination criterion is met; and cause the transmitting node to use the first set of neural network weights of the final iteration, the receiving node to use the second set of neural network weights of the final iteration, and the IRS to use the first set of phase shift matrix values of the final iteration. The node may be the transmitting node. The node may be part of a wireless telecommunications network.

BRIEF DESCRIPTION OF THE FIGURES

In order that the present disclosure may be better understood, embodiments thereof will now be described, by way of example only, with reference to the accompanying drawings in which.

1) transmissions from the base station to the UE without the IRS,
2) transmissions from the base station to the UE with the IRS, in which the determination of the precoding vector of the base station, determination of the phase shift matrix of the IRS, and the signal detection method at the UE are all based on conventional techniques, and
3) transmissions from the base station to the UE with the IRS, based on the method of FIG. 5.

DETAILED DESCRIPTION OF EMBODIMENTS

A first embodiment of a wireless telecommunications system will now be described with reference to FIG. 1. In this embodiment, the wireless telecommunications system is a cellular telecommunications network 1 having a base station 10, an Intelligent Reflective Surface (IRS) 20, and a User Equipment (UE) 30. The base station 10 utilizes M antennas, the IRS 20 includes N reflective elements, and the UE 30 includes K antennas. In this embodiment, both M and K are greater than one such that the wireless telecommunications system operates as a Multiple-Input Multiple-Output (MIMO) system.

Figure 1:
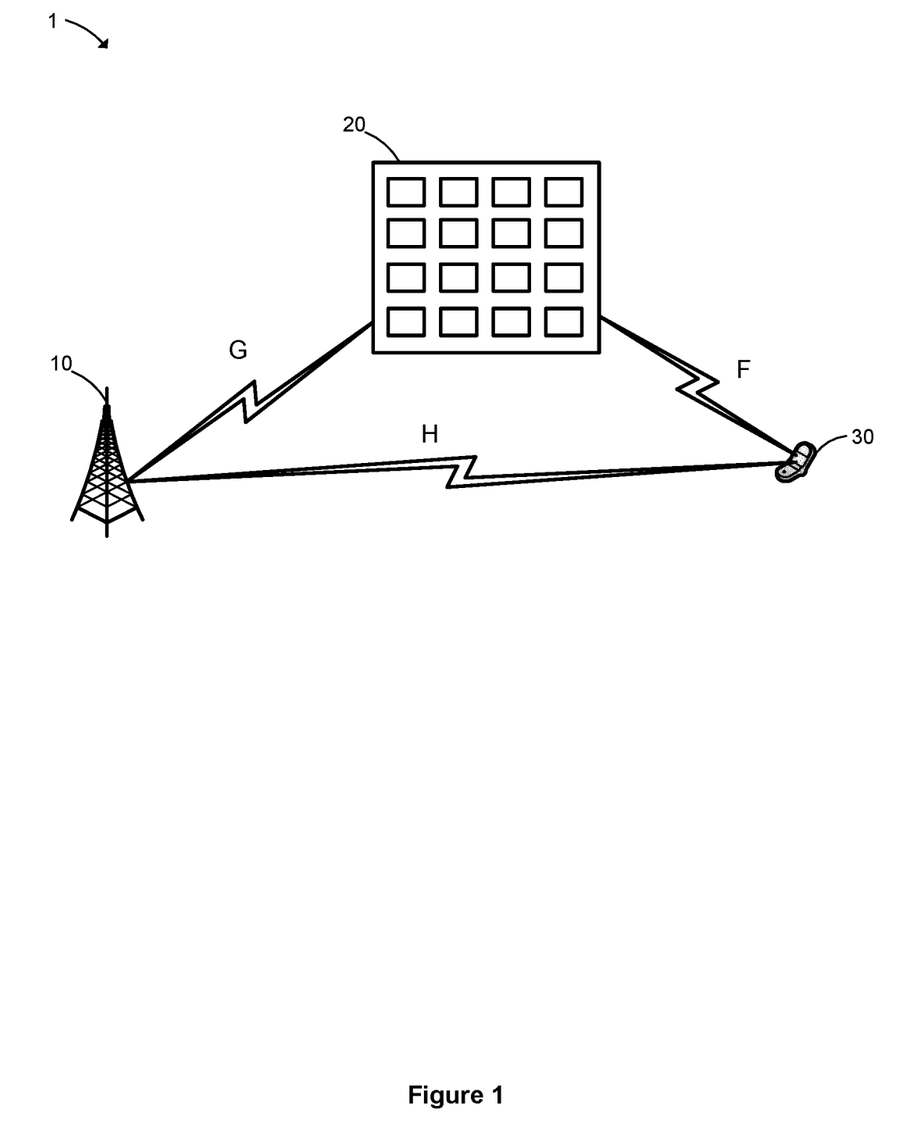
FIG. 1 is a schematic diagram of a cellular telecommunications network of an embodiment of the present disclosure.

A first communications path between the base station 10 and UE 30 includes a direct channel, identified as channel H in FIG. 1, and a second communications path between the base station 10 and UE 30 includes a first channel between the base station and IRS 20, identified as channel G in FIG. 1, and a second channel between the IRS and UE 30, identified as channel F in FIG. 1. In a downlink communication (that is, from the base station 10 to the UE 30), the first channel of the second communications path represents a signal transmitted by the base station 10 that is incident on the IRS 20, and the second channel of the second communications path represents a reflection of the incident signal that is reflected off the IRS 20 and received by the UE 30. The signal received at the UE 30, y, is represented by:

$$y = (F^T \Theta G + H^T)x + n \quad (1)$$

Where:

$y \in \mathbb{C}^{K \times 1}$ is the signal received at the UE 30, $H \in \mathbb{C}^{M \times K}$ is the channel matrix representing the direct channel between the base station 10 and the UE 30, and superscript T indicates the Hermitian transpose, $G \in \mathbb{C}^{N \times M}$ is the channel matrix representing the first channel of the second communications path between the base station 10 and the IRS 20, $F \in \mathbb{C}^{N \times K}$ is the channel matrix representing the second channel of the second communications path between the IRS 20 and UE 30, and superscript T indicates the Hermitian transpose, $\Theta = \mathrm{diag}([\beta_1 e^{j\varphi_1}, \beta_2 e^{j\varphi_2}, \ldots, \beta_N e^{j\varphi_N}])$ is the phase shift matrix with each diagonal element representing the reflection coefficient of a reflective element of the IRS 20, in which $|\beta_i| \leq 1$ due to the constraints of the IRS 20, x is the transmitted signal from the base station 10 and keeps normalized power constraints $\|x\|_2 = 1$, and $n \in \mathbb{C}^{K \times 1}$ is an Additive White Gaussian Noise (AWGN) vector which satisfies $n \sim CN(0, \sigma^2 I_K)$, where $\sigma^2$ presents the noise power.

Figure 2:
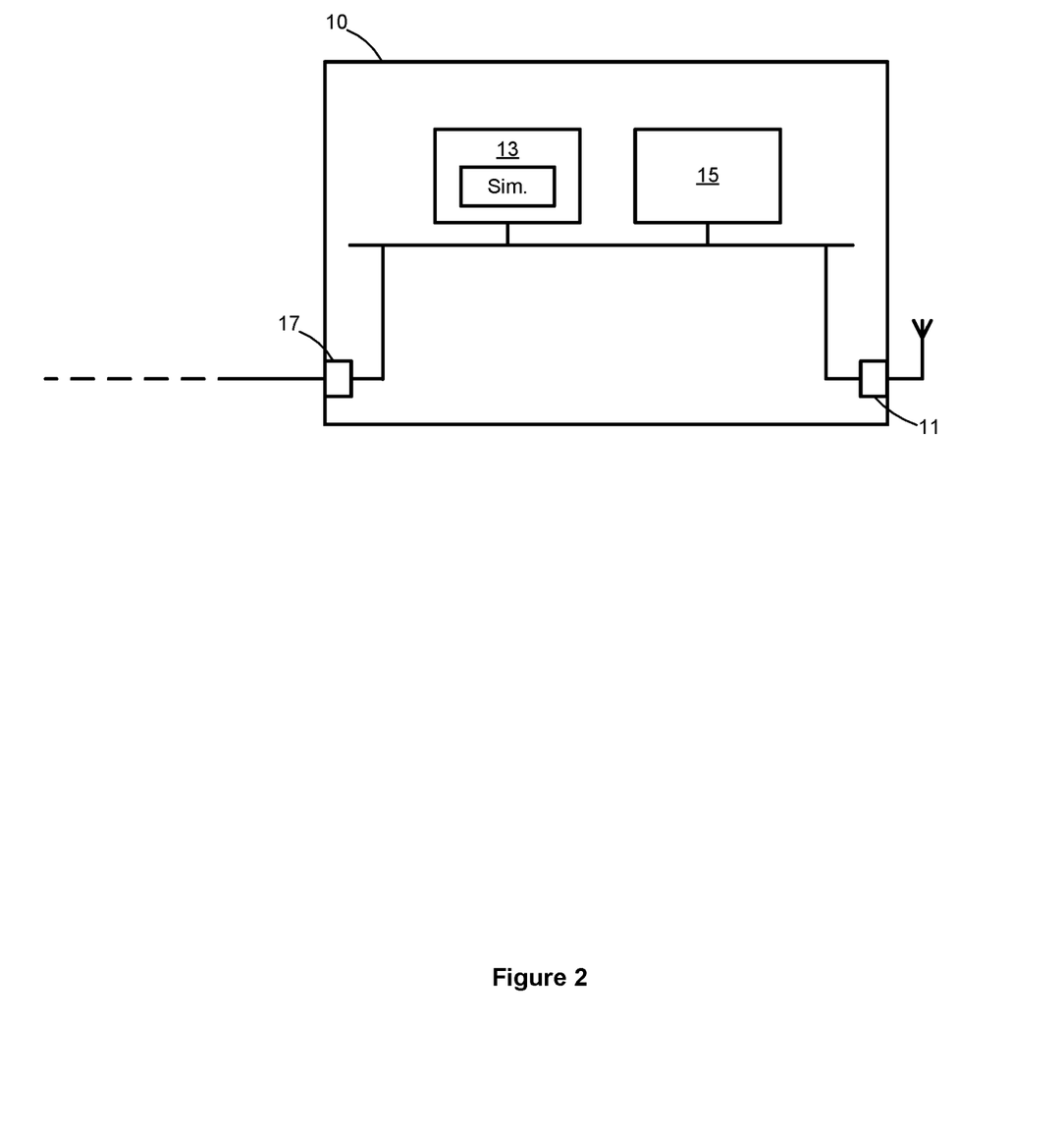
FIG. 2 is a schematic diagram of a base station of the network of FIG. 1.

As shown in FIG. 2, the base station 10 includes a first communications interface 11 that is connectable to an antenna for transmitting and receiving wireless signals, a processor 13, memory 15, and a second communications interface 17 that is connectable to a wired backhaul connection to a core network (not shown). In this embodiment, the processor 13 implements a base station neural network which, for a given input bit sequence, b, outputs a signal, x, to be transmitted by the antenna. In this embodiment, the base station neural network is implemented based on the following layout:

TABLE 1

Layout of the base station neural network in the base station 10

| Layer | Output Dimensions |
|---|---|
| Input | k |
| Dense + ReLU | 4M |
| Dense + ReLU | 4M |
| Dense + Linear | 2M |
| Normalization (to meet power constraints $\|x\|_2 = 1$) | 2M |
| Real to Complex | M |

The training and operational phases of the base station neural network, in particular the determination of the weights, $W_{BS}$, of the base station neural network, are described below.

In this embodiment, the base station 10 is configured to determine, using a channel estimation scheme, the Channel State Information (CSI) for channel H between the base station 10 and UE 30 of the direct communications path, the CSI for channel F between the base station 10 and IRS 20 of the second communications path, and the CSI for channel G between the IRS 20 and UE 30 of the second communications path. An example channel estimation scheme that may be used by the base station 10 is based on Minimum Mean Squared Error (MMSE), as proposed in "Intelligent reflecting surface assisted wireless communication: Modeling and channel estimation," by Q.-U.-A. Nadeem, A. Kammoun, A. Chaaban, M. Debbah, and M.-S. Alouini.

Figure 3:
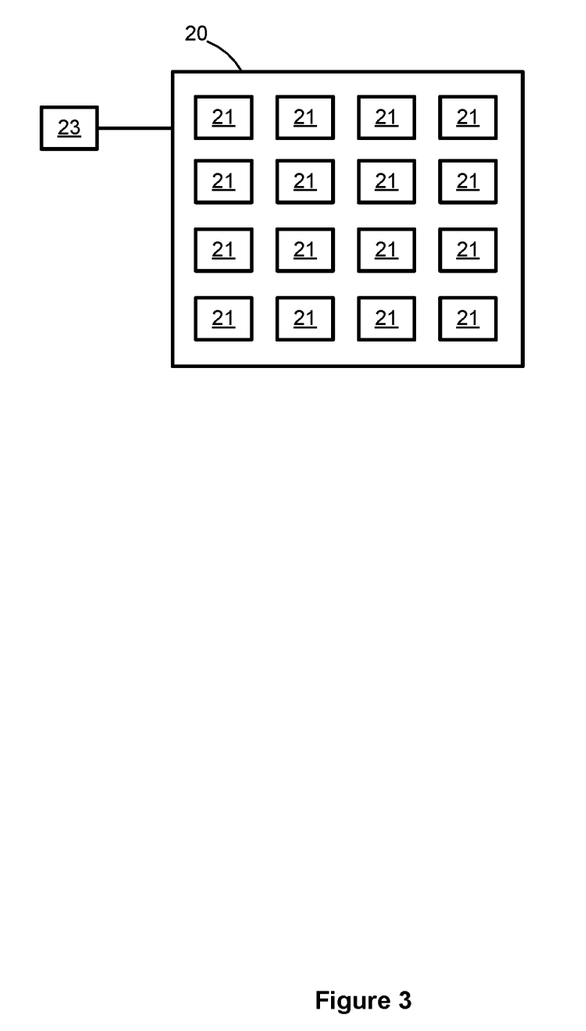
FIG. 3 is a schematic diagram of an Intelligent Reflective Surface (IRS) of the network of FIG. 1.

As shown in FIG. 3, the IRS 20 includes a set of reflective elements 21 and a processor 23 for causing each reflective element of the set of reflective elements 21 to apply a phase shift to an incident wireless signal according to the reflection coefficient of the phase shift matrix element corresponding to that reflective element. The determination of the phase shift matrix is also described below.

Figure 4:
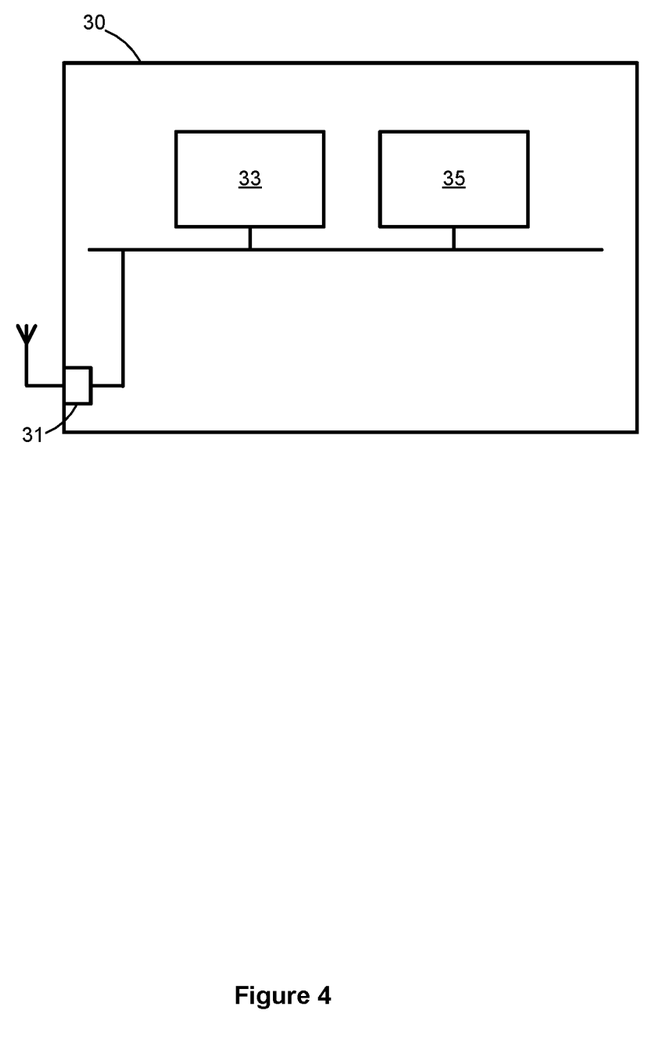
FIG. 4 is a schematic diagram of a User Equipment (UE) of the network of FIG. 1.

As shown in FIG. 4, the UE 30 includes a first communications interface 31 which is connectable to an antenna for transmitting and receiving wireless signals, a processor 33, and memory 35. In this embodiment, the processor 33 implements a UE neural network which, for a given input wireless signal, y, outputs an output bit sequence, $\hat{b}$, for higher layer processing. In this embodiment, the UE neural network is implemented based on the following layout:

TABLE 2

Layout of the UE neural network in the UE 30

| Layer | Output Dimensions |
|---|---|
| Input | K |
| Complex to Real | 2K |
| Dense + ReLU | 2M |
| Dense + ReLU | 2M |
| Dense + Sigmoid | k |

The training and operational phases of the UE neural network, in particular the determination of the weights, $W_{UE}$, of the UE neural network, are described below.

Turning back to the base station 10 of FIG. 2, the base station's processor 13 is further configured to operate a simulation environment (on a suitably configured Field-Programmable Gate Array (FPGA)) for simulating a transmission of a wireless signal between the base station 10 and UE 30 via the IRS 20. Accordingly, the processor 13 may determine:

1. A simulated output signal, x, of a simulated base station neural network for a given input bit sequence, b, and given set of base station neural network weights, $W_{BS}$;
2. A simulated received signal, y, as received by the UE 30 based on the simulated output, x, of the base station neural network, the channel matrix, H, representing the direct channel between the base station 10 and UE 30 of the first communications path, the channel matrix, G, representing the channel between the base station 10 and IRS 20 of the second communications path, the channel matrix, F, representing the channel between the IRS 20 and UE 30 of the second communications path, the phase shift matrix, Θ, of the IRS 20, and the noise vector, n; and
3. A simulated output bit sequence, $\hat{b}$, based on the simulated received signal, y, and a simulated UE neural network for a given set of UE neural network weights, $W_{UE}$ (wherein $\hat{b} \in [0,1]$ is a continuously distributed variable in which $\hat{b}=1$ if $\hat{b}>0.5$ and $\hat{b}=0$ if $\hat{b} \leq 0.5$).

The simulation environment is further configured to calculate a loss (i.e. the degree of difference) between an input bit sequence, b, and the simulated output bit sequence, $\hat{b}$, following simulation of the transmission of that input bit sequence, hereinafter denoted loss(b, $\hat{b}$). In this embodiment, loss(b, $\hat{b}$) is calculated using a cross entropy function.

In addition to simulating a transmission, the processor 13 is further configured to model the system and update the values for the base station neural network, the UE neural network, and the phase shift matrix (to be used in subsequent simulations and/or the base station 10, IRS 20 and UE 30). In this embodiment, the system is modelled as an autoencoder in which a first component models the base station neural network (as used by the base station and in the simulation, based on table 1 above), a second component models the UE neural network (as used by the UE neural network and in the simulation, based on table 2 above) and a third component models the operation of the IRS 20. The third component of the autoencoder is based on the following layout:

TABLE 3

Layout of the third component of the autoencoder modelling the phase shift matrix

| Layer | Output dimensions |
|---|---|
| Input | 2M |
| Normalization (to meet IRS 20 hardware constraints $\|\beta_i\| \leq 1$) | 2M |
| Real to Complex | M |
| Phase shift | M |

In a training phase, the processor 13 updates the weights for the first component of the autoencoder (representing the base station neural network), the weights for the second component of the autoencoder (representing the UE neural network), and the weights for the third component of the autoencoder (representing the phase shift matrix), using a backpropagation (BP) algorithm as follows:

$$W_{BS}^{t+1} = W_{BS}^t - \eta \cdot \nabla W_{BS}^t \quad (2)$$

$$\Theta^{t+1} = \Theta^t - \eta \cdot \nabla \Theta^t \quad (3)$$

$$W_{UE}^{t+1} = W_{UE}^t - \eta \cdot \nabla W_{UE}^t \quad (4)$$

Where η is the learning rate, $\nabla W_{BS}^t$ is the gradient of $W_{BS}^t$ to the calculated loss, loss(b, $\hat{b}$) of the simulated transmission, $\nabla \Theta^t$ is the gradient of $\Theta^t$ to the calculated loss, loss(b, $\hat{b}$) of the simulated transmission, and $\nabla W_{UE}^t$ is the gradient of $W_{UE}^t$ to the calculated loss, loss(b, $\hat{b}$) of the simulated transmission.

An example processing environment that may be used is provided by Keras, available at https://keras.io, which provides suitable deep learning libraries for this embodiment.

Figure 5:
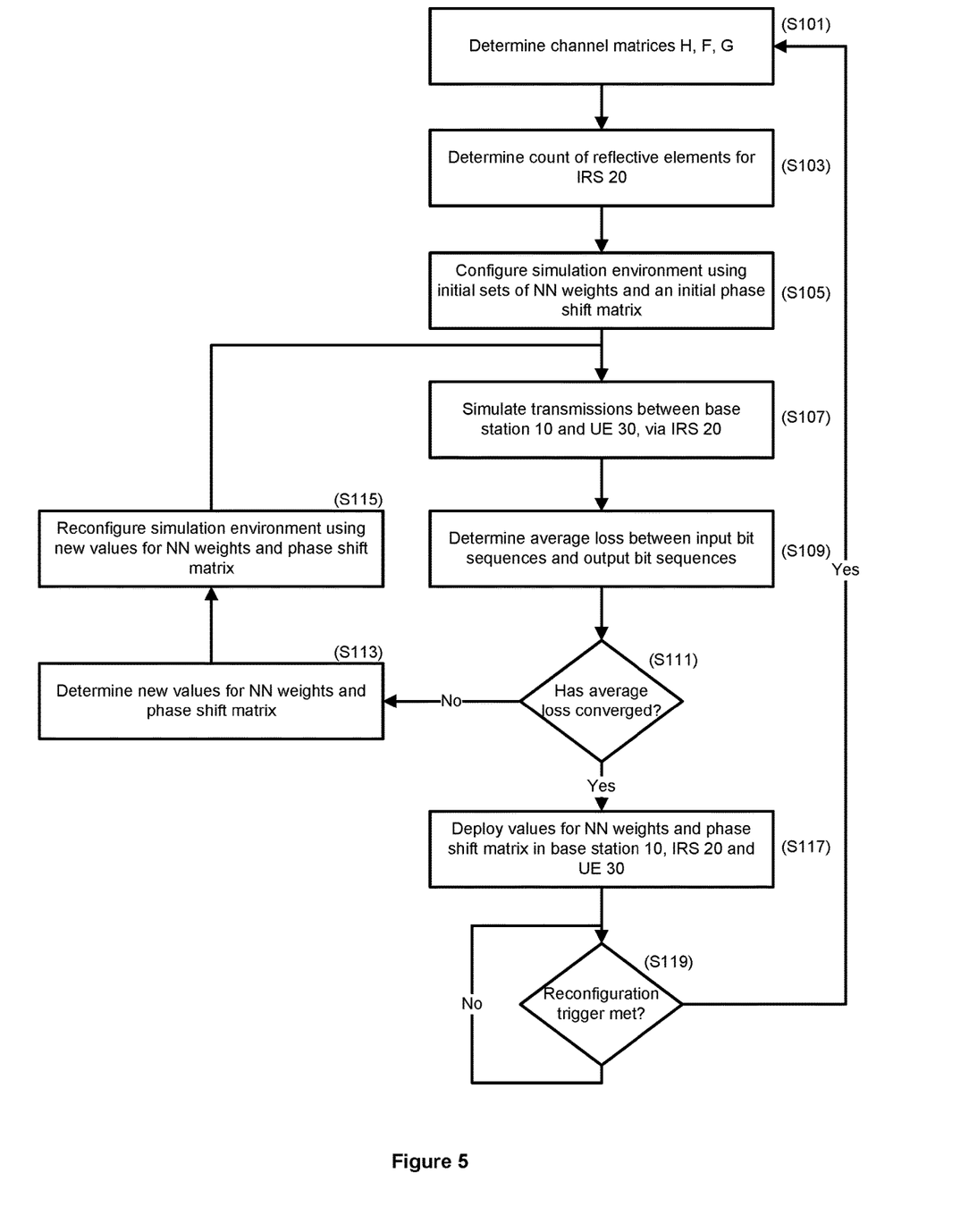
FIG. 5 is a flow diagram illustrating an embodiment of a method of the present disclosure.

A method of transmitting a wireless signal between the base station 10 and UE will now be described with reference to FIG. 5. In this embodiment, the method is performed on the base station 10. In S101, the base station 10 determines the channel matrix, H, representing the direct channel between the base station 10 and UE 30 of the first communications path, the channel matrix, G, representing the channel between the base station 10 and IRS 20 of the second communications path, and the channel matrix, F, representing the channel between the IRS 20 and UE 30 of the second communications path. In this example, the base station 10 uses the MMSE channel estimation scheme to determine these channel matrices. In S103, the base station 10 further determines a count, N, of reflective elements in the set of reflective elements of the IRS 20. The count, N, may be known to the base station 10 (e.g. as a predetermined parameter) or may be reported to the base station 10 as part of the channel feedback.

In S105, the base station 10 configures its simulation environment so that it may simulate a transmission of a wireless signal from the base station 10 to the UE 30, via the IRS 20, based on this data. Accordingly, the processor 13 configures an initial state for the base station neural network based on an initial set of weights, $W_{BS}^0$, an initial phase matrix $\Theta^0$ based on the count, N, of reflective elements in the set of reflective elements, and an initial state for the UE neural network based on an initial set of weights, $W_{UE}^0$. These initial parameters may be generated by Xavier (for example, using the technique described in "Understanding the difficulty of training deep feedforward neural networks.", X. Glorot and Y. Bengio, Journal of Machine Learning Research, vol. 9, pp. 249-256, January 2010) or MSRA (for example, using the technique described in "Delving Deep into Rectifiers: Surpassing Human-Level Performance on ImageNet Classification,", K. He, X. Zhang, S. Ren and J. Sun, arXiv preprint arXiv: 1502.01852, February 2015). However, other initialization methods, such as constant initialization, Gaussian initialization, and uniform initialization may be used. The processor 13 further establishes a noise vector, n, for the simulation.

In S107, a transmission between the base station 10 and UE 30, via the IRS 20, is simulated using the current simulation environment (which, in this first iteration of this method, is in its initial state as described in S105 above) for a training bit sequence, b. As described above, the simulation environment determines an output bit sequence, $\hat{b}$, for this training bit sequence, b. The operation at S107 is repeated for a plurality of training bit sequences, each determining an output bit sequence for each training bit sequence. In S109, the base station 10 calculates the loss, loss(b, $\hat{b}$), between each output bit sequence, $\hat{b}$, and corresponding training bit sequence, b, and further calculates an average loss, $loss_{av}$, of all these calculated losses.

In S111, the base station 10 determines whether the average loss, $loss_{av}$, has converged. The average loss, $loss_{av}$, converges when its value in the current iteration does not deviate from its value in the previous i iterations (in which i is a number greater than or equal to 1) by a predetermined amount. In this first iteration, there are no previous iterations to compare the average loss, $loss_{av}$, to and so the process continues to S113. The process following a positive determination that the average loss, $loss_{av}$, has converged will be described later in the description.

In S113, the base station 10 updates the base station neural network weights, the phase matrix, and the UE neural network weights based on the average loss, $loss_{av}$, from S109 (as described above).

In S115, the base station 10 reconfigures its simulation environment so that it may simulate a transmission of a wireless signal from the base station 10 to the UE 30, via the IRS 20, based on the updated values for the base station neural network weights, $W_{BS}^{t+1}$ (calculated in S113 of the current iteration), on the updated values for the phase shift matrix $\Theta^{t+1}$ (calculated in S113 of the current iteration), and on the updated values for UE neural network weights, $W_{UE}^{t+1}$ (calculated in S113 of the current iteration).

The process then loops back to S107, in which a further plurality of transmissions between the base station 10 and UE 30, via the IRS 20, are simulated using the reconfigured simulation environment (as reconfigured in S115 of the previous iteration) for the plurality of training bit sequences, b. The method then proceeds to calculate a new average loss, $loss_{av}$, in S109 and determines whether the average loss, $loss_{av}$, has converged in S111. Accordingly, the method of this embodiment iterates through various configurations of the base station neural network weights, UE neural network weights and phase shift matrix, with each iteration's configuration determined using the BP algorithm based on the previous iteration's average loss, until the average loss converges at its minimum value. The BP algorithm therefore operates to minimize the loss and thus minimize the Bit Error Rate (BER), i.e.:

$$\min_{W_{BS}, W_{UE}, \Theta} \text{loss}(b, \hat{b}) \quad (5)$$
$$\text{s.t. } \|x\|_2 = 1,$$
$$\beta_n \le 1, \forall n = 1, 2, \ldots, N,$$
$$\varphi_n \in [0, 2\pi), \forall n = 1, 2, \ldots, N.$$

Following a positive determination in S111 that the average loss value has converged, the method proceeds to S117 in which the values for the base station neural network weights, UE neural network weights and phase matrix (as used in the final iteration) are deployed in the network 1. Accordingly, the base station's processor 13 configures its base station neural network weights according to the values used in the final iteration, transmits values for the phase shift matrix to the IRS 20, and transmits values for the UE neural network weights to the UE 30. On receipt, the IRS 20 configures its phase shift matrix according to these received values, and the UE 30 configures its UE neural network weights according to these received values.

Following this configuration in S117, all downlink communications from the base station 10 to the UE 30, via the IRS 20, utilize the base station neural network, phase shift matrix, and UE neural network configured with these values. In S119, the base station 10 determines whether a reconfiguration trigger condition has been met. In this embodiment, there are two reconfiguration trigger conditions, 1) that a period of 10 ms has elapsed since the previous performance of the algorithm, and 2) the CSI of one or more of the channels has deviated by a particular threshold (e.g.

10%). The base station may therefore be configured to continually monitor the CSI of the channels, e.g. every 1 ms, to determine if this second reconfiguration trigger condition has been met. Once reconfiguration has been triggered, the process loops back to S101.

Figure 6:
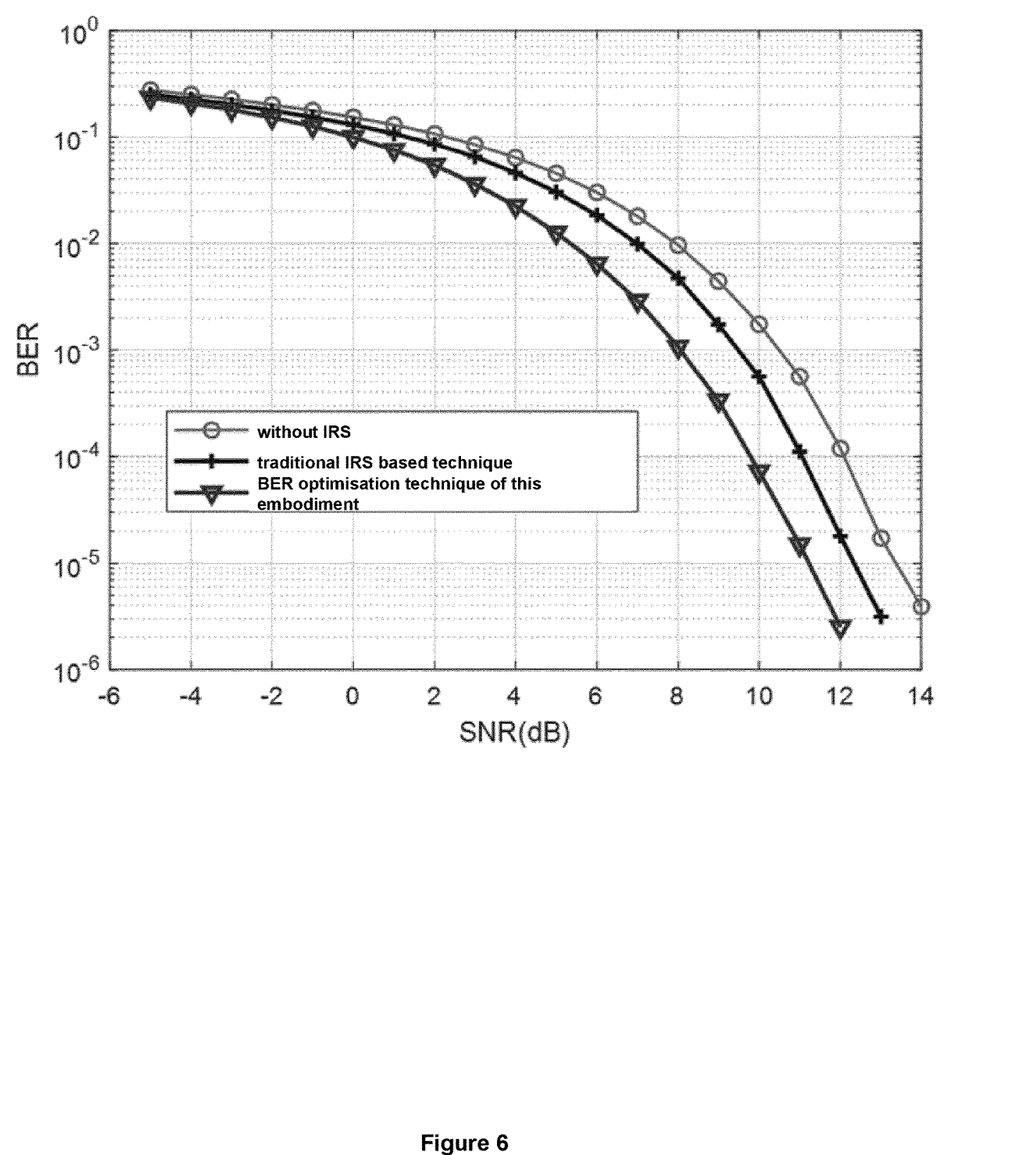
FIG. 6 is a graph illustrating the Bit Error Rate (BER) against Signal-to-Noise Ratio (SNR) for three different scenarios.

The graph of FIG. 6 illustrates simulation results of transmissions at different Signal to Noise Ratios (SNRs) and the bit error rate of that transmission. The simulation is performed for three different scenarios, 1) transmissions from the base station 10 to the UE 30 without the IRS 20, 2) transmissions from the base station 10 to the UE 30 with the IRS 20, in which the determination of the precoding vector of the base station 10, determination of the phase shift matrix of the IRS 20, and the signal detection method at the UE 30 are all based on conventional techniques, and 3) transmissions from the base station 10 to the UE 30 with the IRS 20, based on the above embodiment of the method of present disclosure. It is shown that the above embodiment results in comparatively lower BER, for a given SNR, when implementing the above embodiment compared to the two other scenarios, with greater gains at higher SNRs.

The term IRS is used in the above embodiment, but the skilled person will understand that any equivalent device that may reflect an incident wireless signal and apply a phase shift to the incident wireless signal may be used. An equivalent device may be known as a large intelligent surface, a large intelligent metasurface, a programmable metasurface, a reconfigurable metasurface, a smart reflect-arrays, a reconfigurable intelligent surface, a software-defined surface, and a passive intelligent surface.

Furthermore, in the above embodiment, the base station neural network, UE neural network and phase shift matrix of the IRS are reconfigured by a BP algorithm so as to minimize an average loss between a plurality of training bit sequences input at the base station and the corresponding bit sequences output at the UE, wherein the average loss is based on a cross-entropy function. However, the skilled person will understand that any form of loss function, such as the Mean Squared Error (MSE) loss function, may be used. Furthermore, it is non-essential that a plurality of training bit sequences are used in the simulation. That is, a single training bit sequence may be simulated to determine a loss between that training bit sequence and the output bit sequence for that training bit sequence, and the system parameters may be updated based on that determined loss.

The skilled person will also understand that the base station 10, IRS 20 and UE 30 may be similarly configured for uplink communications. Furthermore, the base station 10, IRS 20 and UE 30 may be configured for both downlink and uplink communications using a duplexing method, such as Time Division Duplex (TDD) or Frequency Division Duplex (FDD), in which the base station 10 and UE 30 use distinct neural networks for downlink and uplink communications and the IRS uses distinct phase shift matrices for downlink and uplink communications. In TDD operation, the phase shift matrix for uplink communications may be transformed from the phase shift matrix for downlink communications, and vice versa.

In the above embodiment, the base station's processor simulation environment is able to simulate the received signal, y, as received by the UE 30 based on the simulated output, x, of the base station neural network, the channel matrix, H, representing the direct channel between the base station 10 and UE 30 of the first communications path, the channel matrix, G, representing the channel between the base station 10 and IRS 20 of the second communications path, the channel matrix, F, representing the channel between the IRS 20 and UE 30 of the second communications path, the phase matrix, $\Theta$, of the IRS 20, and the noise vector, n. The simulation is further based on a simulated channel fading. In this embodiment, large-scale fading and small-scale fading are considered simultaneously. Large-scale fading is distance-dependent, and can be expressed as:

$$f(d) = C_0 d^{-\alpha} \quad (6)$$

Where $C_0$ is a frequency dependent constant value, d is the distance between the transmitter and receiver, and $\alpha$ is the path loss exponent. Since the base station to IRS to UE path suffers a "double-fading" effect, the path loss exponent is usually set as $\alpha_{BS-IRS} = \alpha_{IRS-UE} = 2$. As for the small-scale fading, we adopt the traditional Rayleigh fading channel model, where each entry of the channel matrix follows a complex Gaussian distribution. However, the skilled person will understand that this channel fading model is non-essential for the simulation, and other channel fading models may be used instead.

The skilled person will understand that the particular arrangements of the neural networks are non-essential, and other implementations are possible. Furthermore, the skilled person will understand that the implementation in a cellular telecommunications network is non-essential, and that the above embodiment may be applied to other forms of wireless telecommunications network.

The skilled person will also understand that it is non-essential that the method is performed by the transmitting node. That is, any other node, including a centralized entity, may perform the method and send update messages to the transmitting node, IRS and receiving node to update their configurations.

The skilled person will understand that any combination of features is possible within the scope of the disclosure, as claimed.

The invention claimed is:

1. A method of controlling transmission of a wireless signal in a wireless telecommunications network, the wireless telecommunications network including a transmitting node, a receiving node, and an Intelligent Reflective Surface (IRS), wherein the transmitting node includes a processor operating a first neural network that inputs an input bit sequence and outputs the wireless signal and further includes a transmitter to transmit the wireless signal output by the first neural network, the IRS includes a reflective surface for reflecting the wireless signal transmitted by the transmitter of the transmitting node and further includes a processor for applying a phase change to the wireless signal according to a phase shift matrix, and the receiving node includes a receiver for receiving an accumulated wireless signal transmitted by the transmitter of the transmitting node and reflected off the reflective surface of the IRS and further includes a processor operating a second neural network that inputs the received accumulated wireless signal and outputs an output bit sequence, the method comprising:

determining a current propagation environment for a transmission between the transmitter and the receiver;

simulating a transmission of a first input bit sequence between the transmitting node and the receiving node via the IRS for the current propagation environment, wherein the first neural network utilizes a first set of neural network weights, the second neural network utilizes a second set of neural network weights, and the IRS utilizes a first phase shift matrix having a first set of phase shift matrix values, the simulating producing a first output bit sequence;

calculating a loss between the first input bit sequence and the first output bit sequence;

iterating the simulating and the calculating for a plurality of iterations, wherein the first set of neural network weights, the second set of neural network weights, and the first set of phase shift matrix values are updated in each iteration based on the calculated loss of a previous iteration, until a termination condition is met; and causing the transmitting node to use the first set of neural network weights of a final iteration, wherein the receiving node uses the second set of neural network weights of the final iteration, and the IRS uses the first set of phase shift matrix values of the final iteration.

2. The method as claimed in claim 1, wherein the termination condition is that the calculated loss has converged for a plurality of iterations.

3. The method as claimed in claim 2, wherein the termination condition is that the calculated loss has converged at or near a minimum value for a plurality of iterations.

4. The method as claimed in claim 1, wherein the loss is calculated based on a cross-entropy loss function.

5. The method as claimed in claim 1, further comprising:
determining that a reconfiguration condition has been met; and
in response to determining that the reconfiguration condition has been met, repeating the determining of the current propagation environment, the simulating, the calculating, the iterating, and the causing of the transmitting node to use the first set of neural network weights of the final iteration.

6. The method as claimed in claim 1, wherein the method is performed by the transmitting node.

7. A non-transitory computer-readable storage medium storing a computer program comprising instructions which, when the computer program is executed by a computer, cause the computer to carry out the method of claim 1.

8. A system comprising:
at least one processor and memory comprising a computer program which, when executed by the at least one processor, cause the system to carry out the method of claim 1.

9. A node for controlling transmission of a wireless signal in a wireless telecommunications network, the wireless telecommunications network including a transmitting node, a receiving node, and an Intelligent Reflective Surface (IRS), wherein the transmitting node includes a processor operating a first neural network that inputs an input bit sequence and outputs the wireless signal and further includes a transmitter to transmit the wireless signal output by the first neural network, the IRS includes a reflective surface for reflecting the wireless signal transmitted by the transmitter of the transmitting node and further includes a processor for applying a phase change to the wireless signal according to a phase shift matrix, and the receiving node includes a receiver for receiving an accumulated wireless signal transmitted by the transmitter of the transmitting node and reflected off the reflective surface of the IRS and further includes a processor operating a second neural network that inputs the received accumulated wireless signal and outputs an output bit sequence, the node comprising a processor adapted to:

determine a current propagation environment for a transmission between the transmitter and the receiver;

simulate a transmission of a first input bit sequence between the transmitting node and the receiving node via the IRS for the current propagation environment, wherein the first neural network utilizes a first set of neural network weights, the second neural network utilizes a second set of neural network weights, and the IRS utilizes a first phase shift matrix having a first set of phase shift matrix values, the simulation producing a first output bit sequence;

calculate a loss between the first input bit sequence and the first output bit sequence;

iterate the simulating and the calculating for a plurality of iterations, wherein the first set of neural network weights, the second set of neural network weights, and the first set of phase shift matrix values are updated in each iteration based on the calculated loss of a previous iteration, until a termination condition is met; and cause the transmitting node to use the first set of neural network weights of a final iteration, the receiving node to use the second set of neural network weights of the final iteration, and the IRS to use the first set of phase shift matrix values of the final iteration.

10. The node as claimed in claim 9, wherein the node is the transmitting node.

11. A wireless telecommunications network including the node of claim 9.

* * * * *